United States Patent
Fan et al.

(10) Patent No.: US 10,652,904 B2
(45) Date of Patent: May 12, 2020

(54) TECHNIQUE FOR CONTROLLING RADIO ACCESS NODES

(71) Applicant: Telefonaktiebolaget LM Ericsson (publ), Stockholm (SE)

(72) Inventors: Rui Fan, Beijing (CN); Qianxi Lu, Beijing (CN); Gunnar Mildh, Sollentuna (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/742,323

(22) PCT Filed: Jul. 9, 2015

(86) PCT No.: PCT/CN2015/083656
§ 371 (c)(1),
(2) Date: Jan. 5, 2018

(87) PCT Pub. No.: WO2017/004830
PCT Pub. Date: Jan. 12, 2017

(65) Prior Publication Data
US 2018/0206245 A1   Jul. 19, 2018

(51) Int. Cl.
*H04W 72/08* (2009.01)
*H04W 76/15* (2018.01)
(Continued)

(52) U.S. Cl.
CPC ........ *H04W 72/085* (2013.01); *H04B 7/0617* (2013.01); *H04W 72/0446* (2013.01);
(Continued)

(58) Field of Classification Search
CPC .......... H04W 72/0446; H04W 72/085; H04W 72/0453
See application file for complete search history.

(56) References Cited

U.S. PATENT DOCUMENTS 6,667,971 B1 * 12/2003 Modarressi ......... H04L 12/2856
370/352
6,822,963 B1 * 11/2004 Kavak ................ H04Q 11/0478
370/395.21
(Continued)

FOREIGN PATENT DOCUMENTS

CN     101873644 A    10/2010
CN     101931439 A    12/2010
(Continued)

OTHER PUBLICATIONS

Giust,F., "Distributed Mobility Management for a Flat Architecture in 5G Mobile Networks: Solutions, Analysis and Experimental Validation", Tesis Doctoral Universidad Carlos III de Madrid, Mar. 2015, pp. 1-195, Leganes, Madrid.
(Continued)

*Primary Examiner* — Asad M Nawaz
*Assistant Examiner* — Syed Ali
(74) *Attorney, Agent, or Firm* — Sage Patent Group

(57) ABSTRACT

A technique for controlling a cluster of radio access nodes for radio communication with a user equipment is described. As to a method (200) aspect of the technique, information is received (202) from at least one of the user equipment and the radio access nodes, wherein the information is the cluster indicative of a radio quality (904-908) of the radio communication. Based on the received information, a number of radio access nodes that redundantly communicate with the user equipment is changed (204).

22 Claims, 6 Drawing Sheets

(51) Int. Cl.
*H04B 7/06* (2006.01)
*H04W 72/04* (2009.01)
(52) U.S. Cl.
CPC ....... *H04W 72/0453* (2013.01); *H04W 76/15* (2018.02); *H04W 72/044* (2013.01)

(56) References Cited

U.S. PATENT DOCUMENTS

| | | | |
|---|---|---|---|
| 2005/0027870 A1* | 2/2005 | Trebes, Jr. | H04B 1/715 709/227 |
| 2013/0021925 A1 | 1/2013 | Yin et al. | |
| 2014/0341026 A1* | 11/2014 | Gahm | H04L 47/76 370/232 |
| 2015/0055496 A1 | 2/2015 | Zhao et al. | |
| 2015/0095727 A1* | 4/2015 | Cho | H04L 1/0002 714/708 |
| 2016/0057687 A1* | 2/2016 | Horn | H04W 24/10 370/331 |
| 2016/0100230 A1* | 4/2016 | Ma | H04N 21/44209 725/109 |
| 2016/0315859 A1* | 10/2016 | Buesker | H04L 45/741 |
| 2017/0187778 A1* | 6/2017 | Radha | H04L 65/607 |
| 2017/0366618 A1* | 12/2017 | Vrzic | H04L 67/141 |

FOREIGN PATENT DOCUMENTS

| | | |
|---|---|---|
| CN | 102685874 A | 9/2012 |
| CN | 104349483 A | 2/2015 |
| WO | 2012094803 A1 | 7/2012 |
| WO | 2013066416 A1 | 5/2013 |
| WO | 2015052545 A1 | 4/2015 |

OTHER PUBLICATIONS

Dai, B. et al., "Sparse Beamforming and User-Centric Clustering for Downlink Cloud Radio Access Network", ___, pp. 1-14.

White Paper, "LTE Small Cell Enhancement by Dual Connectivity", Working Croup C "Communication Architectures and Technologies", Nov. 2014, pp. 1-22, Version 1.1, Wireless World Research Forum.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.5.0, Mar. 2015, pp. 1-251.

Extended European Search Report for European Patent Application No. 15897486.5 dated Jan. 23, 2019, 8 pages.

* cited by examiner

100

200

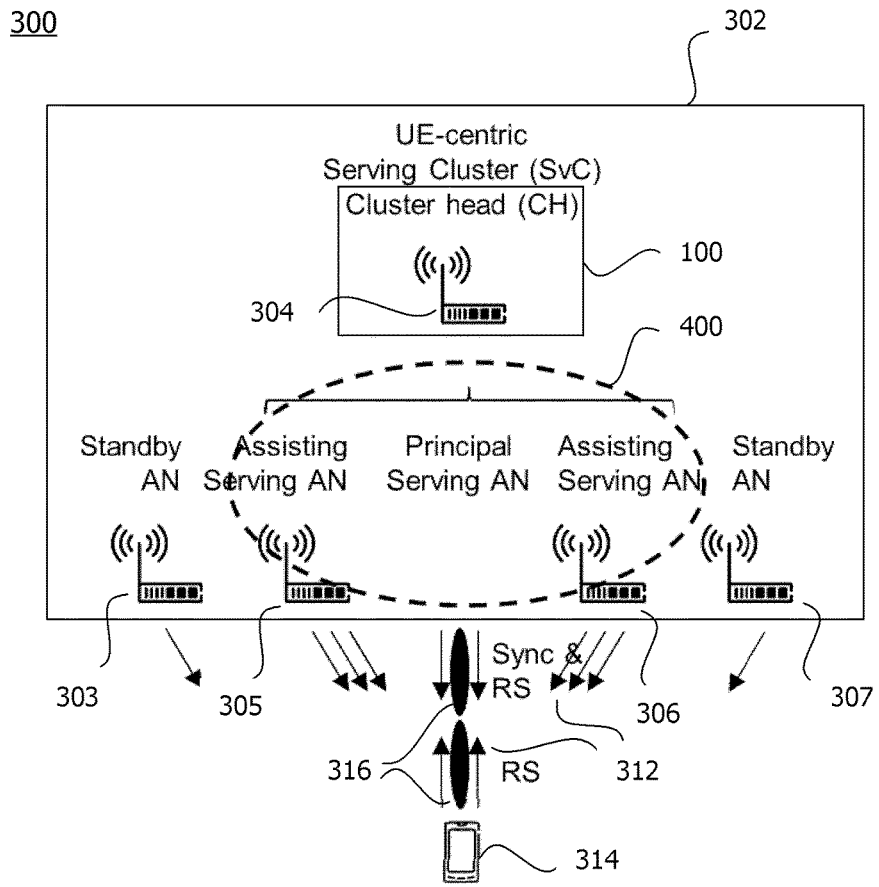
Fig. 5
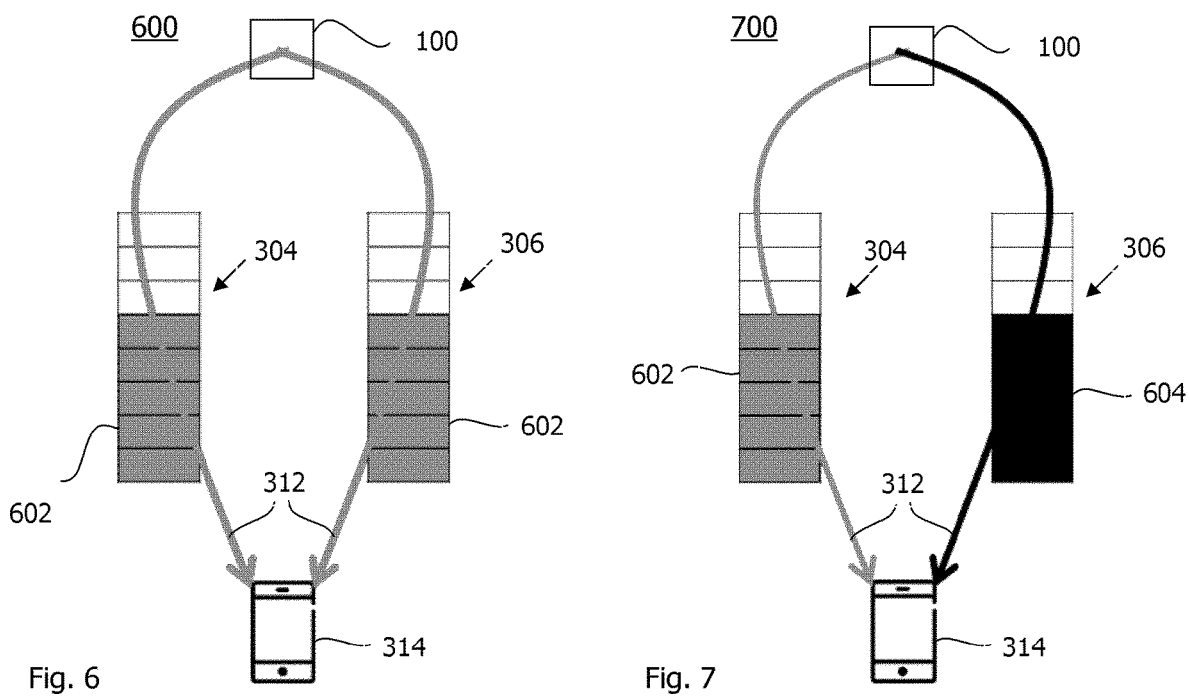
Fig. 6
Fig. 7

TECHNIQUE FOR CONTROLLING RADIO ACCESS NODES

TECHNICAL FIELD

The present disclosure generally relates to a technique for controlling a cluster of radio access nodes. More specifically, and without limitation, a method and a device are described for controlling the radio access nodes for a coordinated spatially diverse radio communication with a user equipment.

BACKGROUND

Dual connectivity for Long Term Evolution (LTE) provided by a macro cell and a smaller cell has been specified in standard document 3GPP TS 36.300 V12.5.0 (inter alia in Sects. 4.9, 6.5, 7.6 and 10.1.2.8). In LTE dual connectivity, a user equipment (UE) connects concurrently to two radio access nodes (also referred to as evolved Node B or eNB in LTE), which are providing radio access in macro cell and the smaller cell, respectively. One eNB is an anchor point for control signaling, which is referred to as a Master eNB (MeNB). That is, the MeNB is connected to a Mobility Management Entity (MME).

The other eNB is referred to as a Secondary eNB (SeNB). The SeNB increases user data throughput in addition to the radio communication with the MeNB. To this end, the MeNB and the SeNB operate on mutually exclusive radio resource elements. The coordination between the MeNB and SeNB includes transmitting different packets from the respective eNB to the UE to increase the throughput received at the UE. White Paper "LTE Small Cell Enhancement by Dual Connectivity" by the Wireless World Research Forum discusses small cell enhancement by dual connectivity.

Next-generation Radio Access Technologies (RATs) use frequency bands at higher carrier frequencies, e.g., in the range of 2.6 GHz to 15 GHz or up to 100 GHz. High-gain beamforming allows compensating negative effects due to unfavorable radio propagation properties at the higher carrier frequencies. However, a serving beam of the high-gain beamforming RAT is optimal only for a small coverage area. When the UE moves, the serving beam can deteriorate fast due to the higher frequency, for which reason mobility is more challenging in the next-generation RATs. General approaches for centralized and distributed mobility management are discussed by F. Giust in doctoral dissertation "Distributed Mobility Management for a Flat Architecture in 5G Mobile Networks: Solutions, Analysis and Experimental Validation", Universidad Carlos III de Madrid, 2015.

SUMMARY

Accordingly, there is a need for a technique that allows controlling radio access nodes, e.g., in a radio access network providing spatial diversity and/or beamforming.

As to one aspect, a method of controlling a cluster of radio access nodes for radio communication with a user equipment (UE) is provided. The method comprises or triggers the step of receiving information from at least one of the UE and the radio access nodes, wherein the information is indicative of a radio quality of the radio communication; and the step of changing, based on the received information, a number of radio access nodes that redundantly communicate with the UE.

The technique may allow coordinating the radio access nodes in the cluster and/or the UE in the context of the cluster. The technique may allow handling radio connections provided by at least (or some of) the radio access nodes in the cluster.

Out of the radio access nodes in the cluster, the number of radio access nodes may be utilized for providing redundancy in the radio communication, e.g., responsive to the radio quality. The number of radio access nodes may be used on a case-by-case basis and/or may be guided by a controlling rule or controlling scheme.

The radio communication may encompass one or more radio links or access legs. Each of the radio links or access legs may be brought about by a specific combination of the UE and one of the radio access nodes. The radio quality may relate to a radio link quality or a set of radio link qualities.

The changing step may include switching a mode of operating the cluster. The mode switching may be based on the received information. The mode may be switched between a robustness-oriented mode of operating the cluster, a throughput-oriented mode of operating the cluster, and/or any intermediate mode (or mixed mode).

At least two radio access nodes of the cluster may communicate redundantly in the robustness-oriented mode. Alternatively or in addition, all or at least two radio access nodes of the cluster may communicate non-redundantly in the throughput-oriented mode.

Increasing the number of redundantly communicating radio access nodes may include increasing the number of corresponding or identical data packets that is communicated through different serving radio access nodes. Alternatively or in addition, increasing the number of redundantly communicating radio access nodes may include decreasing the number of different data packets that is communicated through different serving radio access nodes.

Decreasing the number of redundantly communicating radio access nodes may include decreasing the number of corresponding or identical data packets that is communicated through different serving radio access nodes. Alternatively or in addition, decreasing the number of redundantly communicating radio access nodes may include increasing the number of different data packets that is communicated through different serving radio access nodes.

The technique may be applied to control a data flow in the cluster, e.g., to coordinate a user plane in the cluster. The radio communication, e.g., the redundant communication, may include user data. The radio communication with the UE may include transmitting data packets to the UE and/or receiving data packets from the UE. The data packets may be user plane data packets.

Each radio access node may selectively communicate according to one or more beams directed towards the UE. Changing the number of redundantly communicating radio access nodes may further include changing a number of serving beams.

The expression "communication" may refer to transmission, reception or both. Throughout, the expressions "directed", "beam" and/or "beamforming" may relate to reception (e.g., in an uplink radio communication) and/or transmission (e.g., in a downlink radio communication). The reception may be subjected to spatial filtering, directional filtering and/or directional filtering, e.g., using weighting coefficients and/or gain coefficients. The coefficients may be determined based on a channel estimate.

The cluster serving the UE may comprise multiple radio access nodes, e.g., at least three radio access nodes. The cluster may be formed by clustering existing radio access nodes of the radio access network. The radio access nodes of the radio access network may be dynamically clustered.

The radio communication of at least some of the radio access nodes may use beamforming. Clustering may improve UE mobility, e.g., if at least some of the radio access nodes use beamforming for the radio communication. When the UE moves so that a serving beam from one radio access node deteriorates, one or more serving beams from one or more other radio access nodes in the cluster can ensure that the UE is still served, e.g., at a sufficient data rate, at least in some embodiments. The technique may be implemented for a next-generation Radio Access Technology (RAT) or so-called 5G RAT. The radio communication of at least some of the radio access nodes may use an antenna array.

At least some of the radio access nodes of the cluster may be in radio communication with the UE. The radio access nodes in radio communication with the UE may encompass all radio access nodes concurrently serving the UE. The information indicative of the radio quality for at least some of the serving radio access nodes may be provided by the respective radio access node and/or the UE.

Alternatively or in addition, the radio access nodes in radio communication with the UE may encompass radio access nodes within a range of the radio communication with the UE, e.g., if the UE is in a coverage area of the respective radio access node. The information indicative of the radio quality for non-serving radio access nodes may be provided by the UE.

The radio access nodes in the cluster may communicate with the UE on the same carrier frequency. Alternatively or in addition, the radio access nodes may communicate with the UE on mutually exclusive radio resource elements. The radio resource elements may be UE-specific and/or node-specific, e.g., based on time (e.g., slots, subframes and/or radio frames), frequency (e.g., subcarriers and/or resource blocks), code (e.g., scrambling codes and/or spreading codes) and/or space (e.g., spatial diversity and/or beamforming).

The number may be increased responsive to a decrease of the radio quality. Alternatively or in addition, the number may be decreased responsive to an increase of the radio quality. If there is sufficient redundancy in the radio communication with the UE, the number of redundantly communicating radio access nodes may be decreased, e.g., by releasing some connections.

The received information may differentiate the radio quality for different radio access nodes. The radio quality may be indicated specifically for each of the radio access nodes serving the UE. The radio quality may not be accumulated. The radio quality may be received and/or evaluated independently for each radio access node.

At least some of the radio access nodes of the cluster may concurrently serve the UE. The number of redundantly communicating radio access nodes may be a subset (e.g., a proper subset) of the serving radio access nodes. Changing the number of redundantly communicating radio access nodes may include changing the number of serving radio access nodes. The number of redundantly communicating radio access nodes may be less than the number of serving radio access nodes, e.g., if a mixed radio quality is indicated for the different radio access nodes. Using a subset of the serving radio access nodes for the redundant communication may also be referred to as a mixed mode of controlling the cluster.

None or all of the radio access nodes serving the UE may communicate redundantly with the UE before the change. Alternatively or in addition, none or all of the radio access nodes serving the UE may communicate redundantly with the UE after the change. Using none or a few of the serving radio access nodes for the redundant communication may also be referred to as a throughput mode of controlling the cluster. For the throughput mode, the number of radio access nodes that redundantly communicate with the UE may be decreased and/or the number of radio access nodes that are non-redundantly serving the UE may be increased, e.g., to increase a data throughput rate. Using all or a majority of the serving radio access nodes for the redundant communication may also be referred to as a robust mode of controlling the cluster. For the robust mode, the number of radio access nodes that redundantly communicate with the UE may be increased and/or the number of radio access nodes that are non-redundantly serving the UE may be decreased, e.g., to decrease a bit error rate.

By changing the number of redundantly communicating nodes, the radio communication with the UE may be switched between the throughput mode, the mixed mode and/or the robust mode.

The redundant communication with the UE may include corresponding copies of the data packets being communicated through the redundantly communicating radio access nodes. Each of the radio access nodes redundantly communicating with the UE may communicate corresponding copies of data packets. The corresponding copies may be communicated concurrently.

It may not always be suitable to transmit different packets via serving radio access nodes. E.g., if the radio quality for the UE is poor relative to all radio access nodes in the cluster, a first priority may be to guarantee that the UE can receive data packets reliably from the cluster. To this end, different radio access nodes in the cluster may redundantly communicate, e.g., to increase robustness of the radio communication. The redundant radio communication may include transmitting, from the number of radio access nodes, the same copy of a data packet to the UE.

Alternatively or in addition, different packets may be transmitted to the UE from different radio access nodes in the cluster, e.g., to increase diversity of the radio communication.

As a further alternative, or further in combination, the cluster may serve the UE according to the diverse radio communication and the redundant radio communication concurrently. For example, a first subset of the radio access nodes (e.g., according to the number of radio access nodes) communicates redundantly while a second subset communicates diversely. The second subset may be the complement to the first subset among the nodes in radio communication with the UE, e.g., among the serving nodes.

For the diverse radio communication and/or the redundant radio communication, beamforming may be applied. Beamforming may be applied at the serving radio access nodes and/or the UE. High-gain beamforming can reduce interference of the serving beams at the UE and/or other UEs.

The method may further comprise or trigger the step of providing, to the respective radio access nodes, the data packets to be transmitted to the UE. The method may be implemented on a data link layer (or layer 2) of a protocol stack for the radio communication. The data packets may be provided to a Radio Link Control (RLC) sublayer at the respective radio access node. The data packets may be provided to the radio access nodes according to a Packet Data Convergence Protocol (PDCP).

At least some of the radio access nodes may communicate with the UE on the same radio frequency. At least some of the radio access nodes may communicate with the UE in a millimeter wavelength band or an Extremely High Frequency band. A carrier frequency of at least some of the radio access nodes may be in the range of 2.4 GHz to 2.6 GHz, 2.6 GHz to 5 GHz, 5 GHz to 15 GHz and/or 15 GHz to 50 GHz or 100 GHz.

The radio access nodes may be located at multiple sites. At least some of the radio access nodes may be located at separate sites. For example, each radio access node in the cluster may be located at a different site.

At least some of the radio access nodes may define different cells of a cellular radio access network. At least two of the radio access nodes may define neighboring cells. The at least two radio access nodes may communicate redundantly with the user equipment, e.g., if the radio quality indicates a mobility transition of the UE between the neighboring cells.

The information received from the UE may be based on at least one of a Reference Signal Received Power (RSRP), a Reference Signal Received Quality (RSRQ) and a path loss measured by the UE.

The received information may be indicative of a service requirement. The information received from the UE may further be indicative of at least one of a communication capability of the UE, a Quality of Service (QoS) requirement (e.g., of the UE or an application executed for or at the UE), a data throughput requirement (e.g., of the UE or a UE application) and sensitivity to packet loss (e.g., of the UE or a UE application).

The information received from one or more of the radio access nodes may be based on a Channel Quality Indicator (CQI). The CQI may, in turn, be received from the UE by the respective radio access node. Alternatively or in addition, the information may be based on packet loss (e.g., packet loss statistics) at the respective radio access node. The packet loss may be determined by a Radio Link Control (RLC), e.g., of the respective radio access node.

The radio quality may be defined and/or measured as the RSRP, RSRQ and/or CQI. For the robustness mode, the radio quality toward a primary serving radio access node (P-SAN) may predominate, e.g., in the changing step. The primary serving radio access node may be an anchor point for control signaling with the UE. For the throughput mode, the changing step may be based on the radio quality toward all serving radio access nodes.

By way of example, the radio quality may be poor, if the RSRP is lower than −90 dBm. Alternatively or in addition, the radio quality may be good if the RSRP is equal to or greater than −90 dBm.

Alternatively or in addition, the information received from one or more of the radio access nodes may be indicative of a load of a backhaul link with the respective radio access node, e.g., a backhaul link between a device performing the method and the respective radio access node.

The method may be performed by one of the radio access nodes serving the UE, e.g., the primary serving radio access node. Control plane signaling may be communicated with the UE exclusively by the one radio access node and/or the primary serving radio access node. Alternatively or in addition, a dedicated entity may perform the method. The entity may be located in and/or associated with the cluster. The method may be performed in a distributed manner, e.g., using a computing cloud.

As to a further aspect, a computer program product is provided. The computer program product comprises program code portions for performing any one of the steps of the method aspect disclosed herein when the computer program product is executed by one or more computing devices. The computer program product may be stored on one or more computer-readable recording media. The computer program product may also be provided for download via a data network, e.g., the radio access network and/or the Internet.

As to a hardware aspect, a device for controlling a cluster of radio access nodes for radio communication with a user equipment is provided. The device is configured to perform or trigger the step of receiving information from at least one of the user equipment and the radio access nodes, wherein the information is indicative of a radio quality of the radio communication; and the step of changing, based on the received information, a number of radio access nodes that redundantly communicate with the user equipment.

The device may further include any feature disclosed in the context of the method aspect. Particularly, a unit of the device may be adapted to perform one or more of the steps of the method aspect.

BRIEF DESCRIPTION OF THE DRAWINGS

Further details of embodiments of the technique are described with reference to the enclosed drawings, wherein:

FIG. 5 shows a third embodiment of a radio access network including a cluster of radio access nodes controlled by the device of FIG. 1;

FIG. 6 schematically illustrates an embodiment of a redundant radio communication;

FIG. 7 schematically illustrates an embodiment of a diverse radio communication;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a next-generation radio access network, it is readily apparent that the technique described herein may also be implemented in any other wireless communication network, including a 3GPP Long Term Evolution (LTE) network, a Wireless Local Area Network (WLAN) according to the standard family IEEE 802.11 (e.g., IEEE 802.11a, g, n or ac) and/or a Worldwide Interoperability for Microwave Access (WiMAX) according to the standard family IEEE 802.16.

Moreover, those skilled in the art will appreciate that the services, functions and steps explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions and steps disclosed herein.

Figure 1:
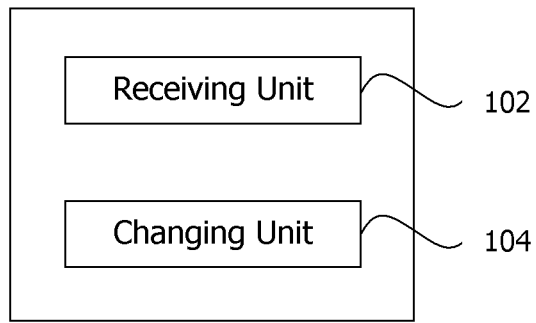
FIG. 1 shows a schematic block diagram of a device for controlling a cluster of radio access nodes.

FIG. 1 shows a block diagram of a device 100 for controlling radio access nodes for radio communication with a user equipment (UE). A receiving unit 102 of the device 100 is configured to receive information, directly or indirectly, from the UE and/or one or more of the radio access nodes.

A controlling unit 104 of the device 100 is configured to control the radio access nodes to concurrently serve the UE so that a number of those radio access nodes that redundantly communicate with the UE changes based on the received information.

Figure 2:
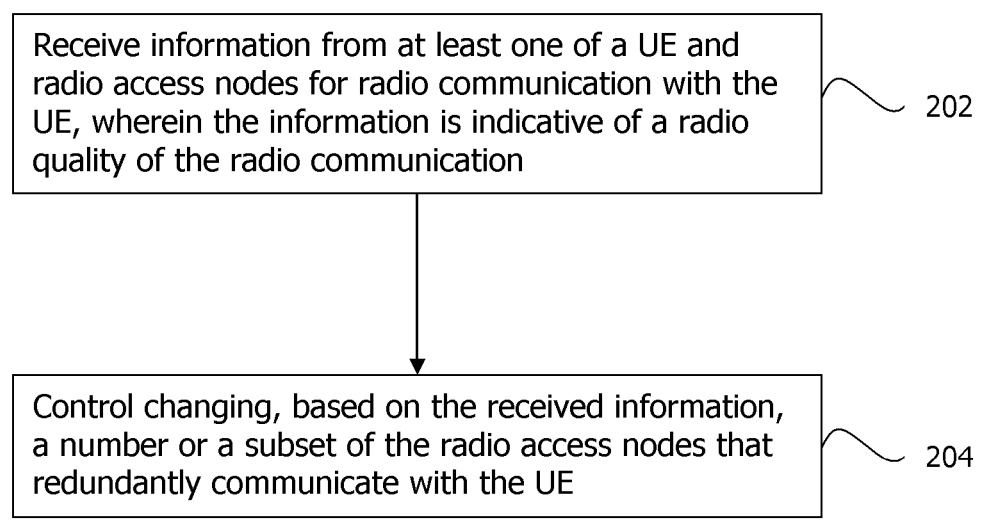
FIG. 2 shows a flowchart for a method of controlling a cluster of radio access nodes.

A block diagram for a method 200 of controlling radio access nodes is shown in FIG. 2. In a step 202 of the method 200, information indicative of a radio quality is received. Based on the received information, a number of those radio access nodes that redundantly communicate with the UE is changed in a step 204 of the method.

The change 204 may also include changing a subset of the redundantly communicating nodes (with or without changing a total number of redundantly communicating nodes).

The method 200 may be performed by the device 100. E.g., the steps 202 and 204 may be implemented by the units 102 and 104, respectively.

Figure 3:
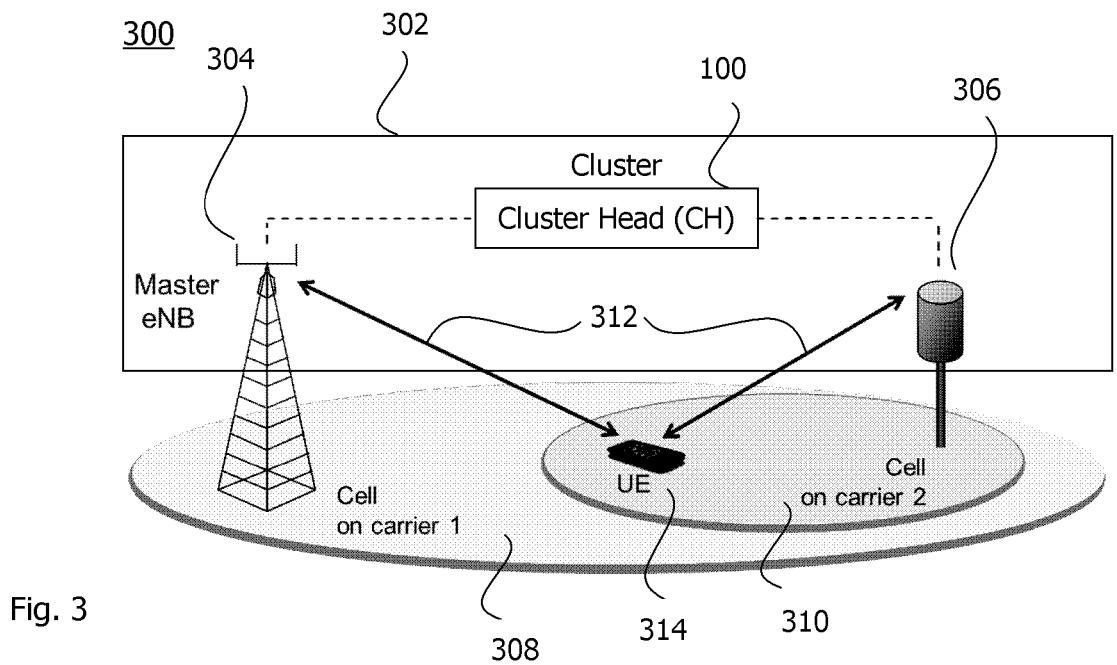
FIG. 3 shows a first embodiment of a radio access network including a cluster of radio access nodes controlled by the device of FIG. 1.

FIG. 3 schematically illustrates a first embodiment of a radio access network 300 including at least two radio access nodes 304 and 306. The radio access nodes 304 and 306 define cells 308 and 310 for a radio communication 312 with a UE 314. Sites for the radio access nodes 304 and 306 may include at least sites conventionally used by a Long Term Evolution (LTE) access network, e.g., for dual connectivity in LTE.

At least for the radio communication 312 with the UE 314, the radio access nodes 304 and 306 define a cluster 302. Clustering radio access nodes has been investigated on the physical layer for next-generation RATs, e.g., by B. Dai and W. Yu in "Sparse Beamforming and User-Centric Clustering for Downlink Cloud Radio Access Network", IEEE Access. At least on a data link layer, the radio access nodes 304 and 306 in the cluster 302 are controlled by the device 100 according to the method 200. Controlling includes forwarding and/or guiding data flow of the user plane in the cluster 302. The device 100 is also referred to as a cluster head.

The method 200 coordinates the multiple sites in the cluster 302, which serve the UE 314 together. The device 100 may be implemented as a cluster head within the cluster 302. The device 100 is responsible for how to coordinate within the cluster 302 different modes of operating the radio access nodes 304 and 306, e.g., according to a robustness-oriented mode or throughput-oriented mode or a mix in between. The different modes are associated with a different number of radio access nodes 304 and 306 that provide a spatially diverse and redundant radio communication with the UE 314.

The mode is controlled according to the information received from the UE 314, the radio access nodes 304 and 306 within the cluster 302, or a combination thereof.

Figure 4:
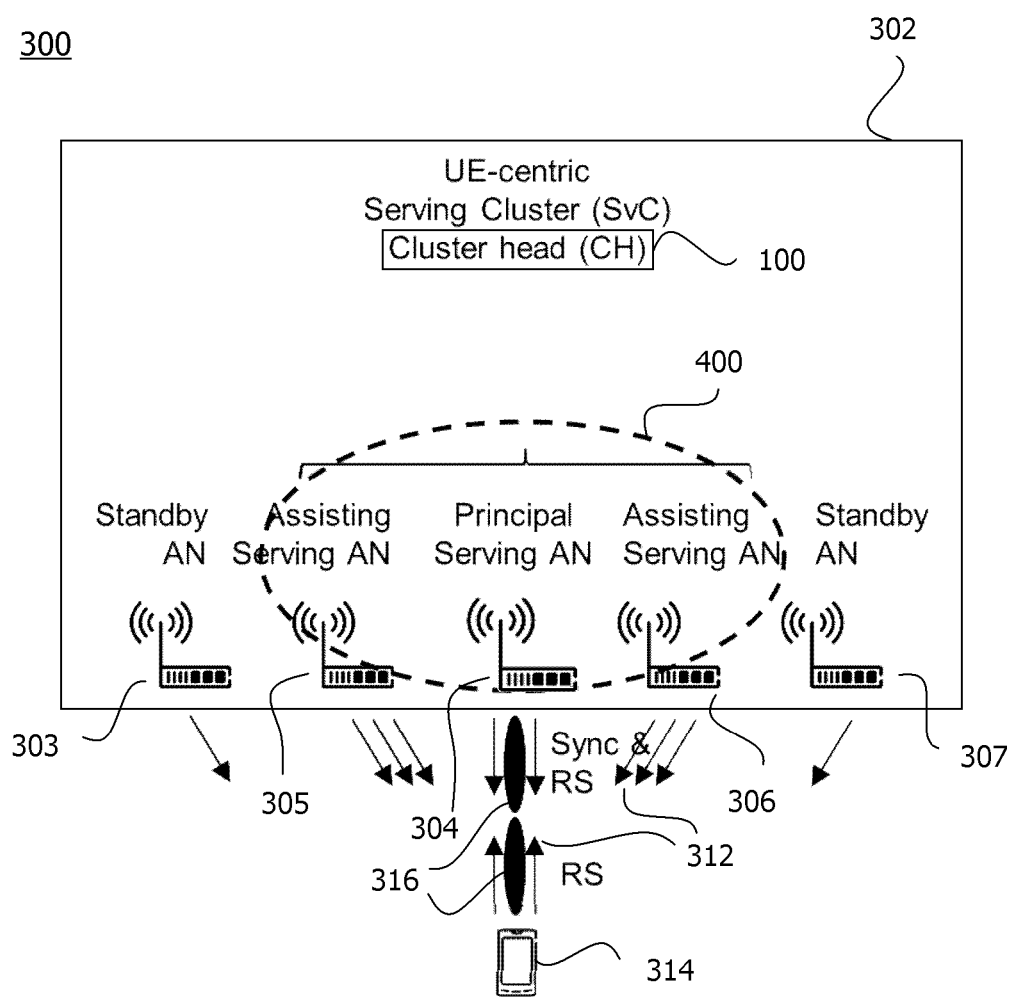
FIG. 4 shows a second embodiment of a radio access network including a cluster of radio access nodes controlled by the device of FIG. 1.

FIG. 4 schematically illustrates a second embodiment of a radio access network 300 including a cluster 302 of radio access nodes 303 to 307. Each of the radio access nodes 303 to 307 may define a cell of the radio access network 300, e.g., as illustrated for the first embodiment.

In the second embodiment shown in FIG. 4, the device 100 is implemented as a separate control node (e.g., a cluster head node) in the cluster 302.

A proper subset 400 of the radio access nodes 303 to 307 including the radio access nodes 304, 305 and 306 is concurrently serving the UE 314. The radio access nodes 303 and 307 are currently not serving the UE 314.

The step 204 of changing may further include changing the number 400 of serving radio access nodes.

The serving subset 400 of the radio access nodes 303 to 307 includes one principal serving access node 304 and at least one assisting serving access node, e.g., the assisting serving access nodes 305 and 306. All control signaling communicated between the cluster 302 and the UE 314 is communicated through the principle serving access node 304.

At least some of the serving radio access nodes 304 to 306 transmit and/or receive Reference Signals (RSs). Based on the received RSs, the UE 314 and/or the radio access nodes determine weighting coefficients for separating antenna streams and/or for beamforming 316.

FIG. 5 schematically illustrates a third embodiment of a radio access network 300 including a cluster 302 of radio access nodes 303 to 307. Like reference signs indicate corresponding features, e.g., according to the first embodiment or the second embodiment.

In the third embodiment shown in FIG. 5, the device 100 is implemented as a cluster head function by one of the serving radio access nodes in the cluster 302, e.g., the principal serving access node 304.

FIGS. 6 and 7 show simplified examples for operating modes 600 and 700, respectively, of the cluster. In the robustness-oriented mode 600, the same copy of each user plane packet 602 is sent, forwarded or guided by the cluster head 100 to all serving access nodes 304 to 306 within the cluster 302 to guarantee that the UE 314 can receive the user plane packets 602 correctly by virtue of spatial diversity in the radio communication 312.

In the throughput-oriented mode 700, different packets 602 and 604 are transmitted from cluster head 100 to different nodes 304 and 306 within the cluster 302 to increase the data throughput received by the UE 314 by virtue of multiple serving beams in the radio communication 312.

The device 100 is provided with means 104 for selecting an efficient operational mode of the cluster and for coordinating the radio access nodes according to the selected operational mode.

The device 100 dynamically controls according to the step 204 the choice of the operational mode being used for the UE 314 that is connected via the multiple serving radio access nodes 304 to 306. The operational mode includes, e.g., the robustness-oriented mode, the throughput-oriented mode or a mixed mode. The mixed mode is a combination of the robustness-oriented mode and the throughput-oriented mode.

The choice is based on relevant information, such as feedback information from the UE 314 and/or the radio access nodes 304 to 306 about the current radio conditions and/or other potentially relevant information.

An architecture of the cluster 302 may be based on an existing architecture in LTE for dual connectivity with enhancements. Within one cluster 302, there is the device 100, i.e., the cluster head, and multiple clustered radio access nodes 303 to 307. The cluster head 100 may be a central node, e.g., implementing only a Packet Data Convergence Protocol (PDCP) layer (e.g., according to the second embodiment in FIG. 4). Alternatively or in addition, the cluster head 100 is realized by one of the radio access nodes 303 to 307 implementing all radio protocol layers. The cluster head 100 is the node or functionality for deciding about how to coordinate the user plane within the cluster.

The coordination of all radio access nodes 303 to 307 within the cluster 302 switches between the robustness-oriented mode 600, the throughput-oriented mode 700 and, optionally, the mixed mode. The robustness-oriented mode 600 requires at least two serving radio access nodes (e.g., 304 and 306) and means that all serving radio access nodes within the cluster 302 receive the same copy of each data packet 602. The throughput-oriented mode 700 requires at least two serving radio access nodes (e.g., 304 and 306) and means that different serving radio access nodes receive different packets 602 and 604 from the cluster head 100. The mixed mode requires at least three serving radio access nodes (e.g., 304, 305 and 306) and means that some of the serving radio access nodes receive the same packets 602 (redundant communication), while one or more other serving radio access nodes receive different packets 604 (diverse communication).

Receiving the data packets (e.g., 602 and/or 604) triggers the respective radio access node to forward the received data packets to the UE 314. The data packets may be provided by the cluster head 100 to the respective radio access node. Alternatively or in combination, the respective radio access node may receive the data packets directly, e.g., from a gateway, wherein the data flow is controlled by the radio head 100.

Figure 8:
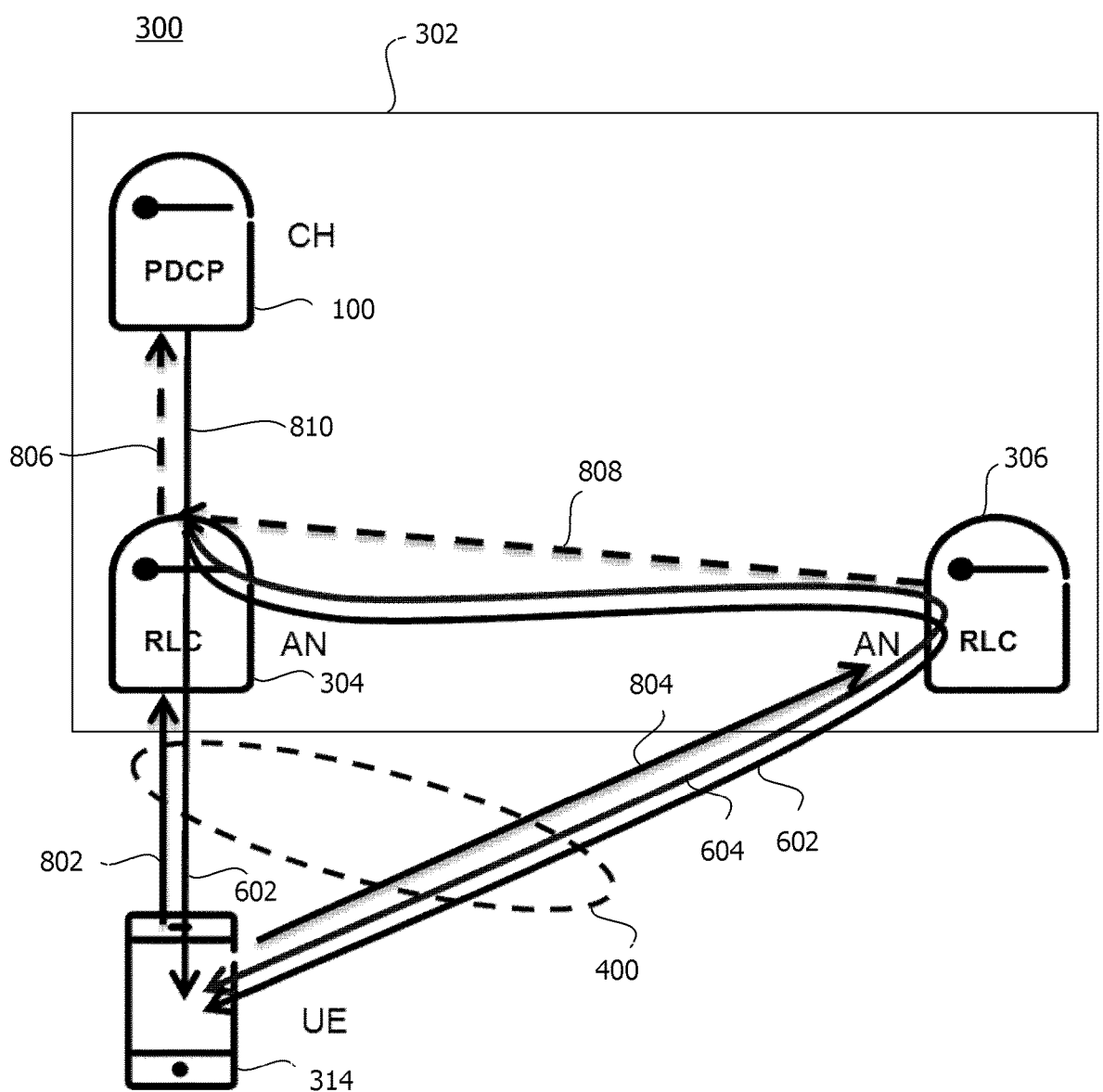
FIG. 8 shows a fourth embodiment of a radio access network including a cluster of radio access nodes controlled by the device of FIG. 1.

An example of user plane coordination within the cluster 302 is schematically illustrated in FIG. 8 using one cluster head 100 and, for clarity, two radio access nodes 304 and 306. Providing the data packets by the cluster head 100 is shown at reference sign 810.

The line at reference sign 602 and the line at reference sign 604 represent different user plane packets or different user plane packet streams. Based on reports 802 and 804 from UE 314, the information 806 and 808 received at the cluster head 100 is derived, forwarded and/or augmented by the radio access nodes 304 and 306, respectively. The information 802 and 804 provided by the UE 314 may include a Channel Quality Indicator (CQI).

Depending on a backhaul topology, the principal serving radio access node 304 may receive the information from the assisting serving radio access node 306 and forward the information 808 to the cluster head, e.g., together with its own the information 806.

The information received in the step 202 is used by the cluster head 100 to make its decisions. The decision process according to the step 204 can be generalized to other or larger cluster structures. The cluster head 100 decides how to coordinate within the cluster 302, based on the feedback information received either from the UE 314 directly or from each radio access node within the cluster 314.

Information that is received, directly or indirectly, from the UE 314 may include a Reference Signal Received Power (RSRP) and/or a Reference Signal Received Quality (RSRQ) measure by the UE 314 for the radio communication 312, or some other radio channel quality measure.

Optionally, the received information further comprises information about throughput requirements and/or packet loss sensitivity, e.g., for applications currently running on the UE 314 or being executed for the UE 314. Other or further types of information that the UE 314 may provide, and which may impact the choice and coordination of operational modes, may be indicative of UE capabilities. The UE capabilities relate to, e.g., operational modes that are supported and/or power limitations. Furthermore, the information may be indicative of a battery or energy status of the UE 314.

Information received from a radio access node may include a converted CQI for the radio communication 312 between the UE 314 and the respective radio access node, a Radio Link Control (RLC) feedback for the radio communication 312 between the UE 314 and the respective radio access node, information about required Hybrid Automatic Repeat Request (HARQ) retransmissions (e.g., an exponential average thereof), etc.

Furthermore, the information received from the radio access node may include information about a current load (e.g., a length of pending data packets queued for radio transmission) on the respective radio access node. The load information may be useful in this context as the load optionally impacts the decision whether the respective radio access node is useful in the different operational modes.

Figure 9:
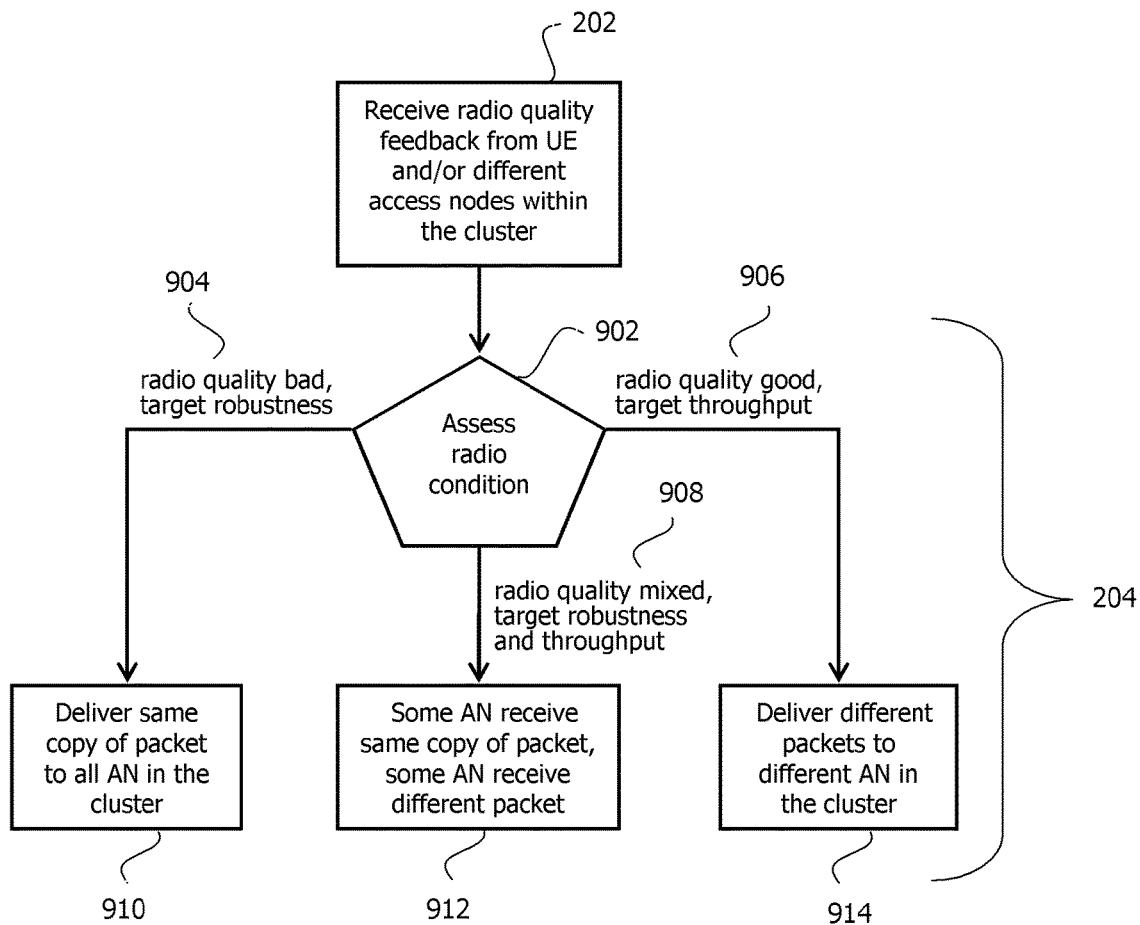
FIG. 9 shows a flowchart for a first implementation of the method of FIG. 2.

FIG. 9 shows a flowchart for a first implementation of the method 200. The radio quality is assess based on received information is in a substep 902 of the step 204. If the received information indicates that the radio condition at the UE 314 is bad (decision branch 904), the cluster head 100 delivers, or controls delivery of, the same copy of PDCP packets 602 to all the serving radio access nodes within the cluster 302.

If the received information indicates that the radio condition is good or very good at the UE 314 (decision branch 906), the cluster head 100 delivers, or controls delivery of, different PDCP packets (e.g., 602 and 604) to different serving radio access nodes within the cluster 302.

If the received information indicates that radio condition is mixed, the cluster head 100 delivers the same copy of PDCP packet to some of the radio access nodes in the cluster, and different PDCP packets to other radio access nodes in the cluster 302. The mixed radio condition may include that the UE 314 has good channel quality towards a subset of the radio access nodes and poor channel quality towards another subset.

For instance, if the current radio condition associated with radio access nodes 304 and 306 is poor, while the radio condition associated with radio access nodes 305 and 307 is good, the cluster head 100 may send PDCP packet 1 to radio access nodes 304 and 306 (thus increasing the probability for successful reception of the packet 1 by the UE 314), while sending PDCP packet 2 to radio access node 305 and PDCP packet 3 to radio access node 307. If this strategy is successful, the UE 314 will receive all three packets (i.e., PDCP packets 1, 2 and 3), thus achieving high throughput, in part due to the increased robustness achieved by sending the same PDCP packet (i.e., PDCP packet 1) redundantly through both radio access nodes 304 and 306.

Further scenarios, use cases and strategies for the coordination are described. Depending on a current situation, the step 204 selects from different coordination options. The current situation may encompass a deployment scenario, a use case, an operational condition and/or a radio conditions, at least partly represented or derived from the received information. The decision in the step 204 may further depend on operator preferences.

Some of the options are different from, or enhancements of, above-described first implementation of the method 200.

For example, the current situation may encompass a transient (handover) situation and the operational mode may include bi-casting. In a handover situation, a robust make-before-break scheme may be achieved by means of bi-casting the same packet copies 602 over both the source beam 316 (or source cell 308) and the target beam (or target cell). The bi-casting may ensure that no packets are lost during the handover. The UE 314 may be located such that it toggles between two beams (or cells). Bi-casting in the two beams (or cells) may allow relaxing requirements for fast beam-switching (which may be demanding both in terms of execution speed and, in case of toggling, resulting processing and signaling load).

For example, the current situation may encompass a transient (handover) situation and the operational mode may include a throughput enhancement. As an alternative or in addition to the bi-casting in handover situations, a temporary throughput boost may be provided in the transient situation when the UE 314 can be connected via both the source beam (or source cell) and the target beam (or target cell). By sending different packets (e.g., 602 and 604) through the different source and target radio access nodes (and/or source and target beams), the data throughput for the UE 314 is temporarily increased (throughput-oriented mode).

Forwarding between the concurrently serving radio access nodes (optionally via the cluster head 100) may be used to ensure that any packets that the source radio access node failed to deliver to the UE 314 are eventually conveyed to the UE 314, albeit via the target radio access node. As an alternative or in addition to forwarding, the cluster head 100 may retransmit the packets that failed to be delivered, e.g. on the PDCP layer.

Figure 10:
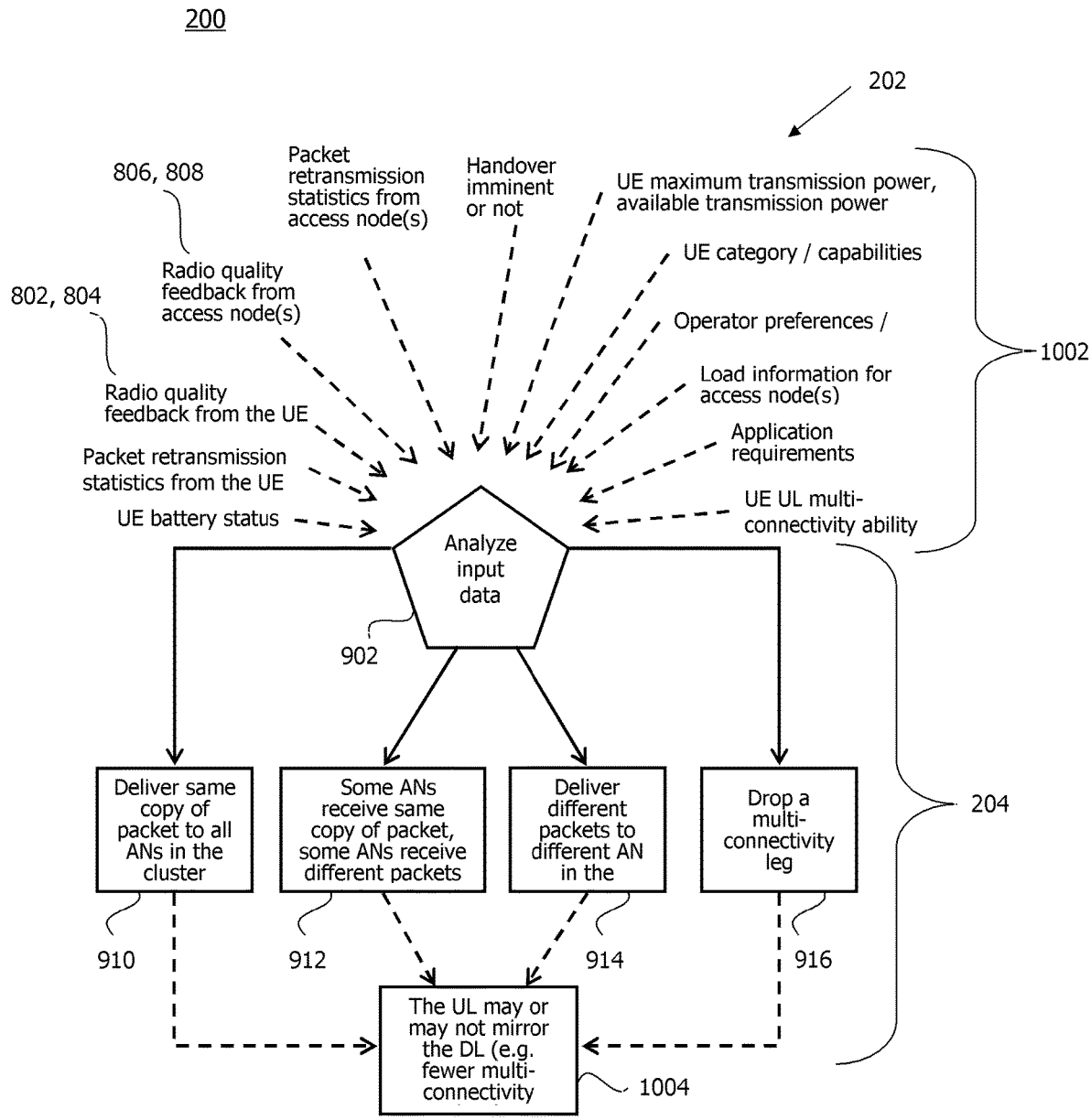
FIG. 10 shows a flowchart for a second implementation of the method of FIG. 2.

In an enhanced embodiment, the operational modes include release of a redundant connection leg, as is illustrated at reference sign 916 in FIG. 10. The UE 314 is initially connected via at least two radio access nodes (or beams or cells). If one of the radio connections is assessed to provide good radio conditions, and the other one is assessed to provide bad radio conditions, resources may be saved by releasing the connection leg through the radio access node (or beam or cell) providing the bad radio conditions.

The rationale for this strategy includes that neither the throughput-oriented mode nor the robustness-oriented mode would be very useful. Since the UE 314 has a good connection leg through the one radio access node (or beam or cell), adding another connection leg providing much worse radio conditions would not even achieve redundancy and, thus, waste resources.

If the radio access leg providing bad radio conditions supports the higher data rate compared to the radio access leg providing good radio conditions, keeping the access leg with bad radio conditions and using the throughput-oriented mode to increase the data throughput might seem to be motivated. However, if the higher-rate access leg is also highly unreliable, bi-casting in combination with the stable access leg would be needed to have acceptable robustness. With or without the additional unreliable access leg, the data rate is limited by the data rate achieved through the stable access leg, which in practice makes the higher-data access rate leg dispensable.

Moreover, the technique is applicable to an intra-access node scenario. While above discussion of operational modes has focused on situations for the UE 314 being simultaneously connectable through multiple radio access nodes, multi-leg connections can also be established via different beams or different cells of the same radio access node. The decisions in the changing step 204 may follow strategies and/or criteria disclosed for the spatially separated nodes. The feedback information acquisition may be simplified, e.g., if the concerned radio access node also acts as the cluster head.

Still further, the technique is applicable to hybrid cases. E.g., the UE 314 may be connected via multiple beams from one radio access node and also via one or more beams from one or more other radio access nodes.

Alternatively or in addition, the technique is applicable to uplink radio communication. The description of above embodiments is focused on downlink traffic for clarity. However, the technique is readily applicable to uplink traffic. In one embodiment, as illustrated at step 1004 in FIG. 10, the UE 314 mirrors the downlink behavior also in the uplink. For example, the UE 314 uses the same operational mode.

Using exactly the same operational mode may not always be possible, e.g., in case the UE 314 does not support simultaneous transmissions through different access legs). Even if the UE 314 supports simultaneous transmissions through different access legs, this ability may be limited to a smaller number of access legs compared to the access legs available for the downlink.

Yet another limitation for uplink may be the available transmission power in the UE. Even if the UE 314 supports simultaneous transmission through different access legs, depending on the current channel conditions and the transmission circuitry of the UE 314 (e.g., one or more power amplifiers), the UE 314 may not be able to produce the compound transmission power required to get the transmissions through in all available access legs.

It may also be the case that the channel conditions of the same access leg varies significantly between the downlink and the uplink, e.g. due to different interference conditions and/or different carrier frequencies being used for the two traffic directions.

Any such situation or any one of such limitations may trigger using different operational modes for the downlink and the uplink, respectively. E.g. the robustness-oriented mode may be selected for the downlink and the throughput-oriented mode may be selected for the uplink.

Feedback sources and information acquisition are described with reference to a second implementation of the method 200 shown in FIG. 10. As has been described above for various embodiments, the information related to the UE 314 and the current radio conditions for radio communication between the UE 314 and the various radio access nodes is the basis for changing the operational mode by the cluster head 100. There are several options for the type of information to use and how to acquire the information collectively referred to by reference sign 1002. The received information 1002 may include any sub-combination of the information items indicated in FIG. 10.

Feedback information 802, 804 retrieved from the UE 314 includes the RSRP and/or the RSRQ, or some other channel quality measure. The information 1002 optionally comprises information about the throughput requirements and/or the packet loss sensitivity. Other types of information that the UE 314 may provide include the UE capabilities, a UE category and the UE's battery/energy status.

The UE capabilities may be signaled explicitly or implicitly, e.g., in the form of the UE category. The UE capabilities may be signaled directly from the UE 314 to the cluster head 100. Alternatively, the UE capabilities may be reported similarly to UE capability signaling handled in LTE, i.e., it is retrieved from the UE 314 when the UE 314 attaches to the radio access network 300 and is stored in the core network (e.g., at a Mobility Management Entity). The UE capability information is downloaded from the core network to each further radio access node the UE 314 connects to. In one embodiment, the cluster head 100 retrieves the information from the core network (or some other hierarchically higher control node). Optionally, the UE 314 provides information about its RLC feedback and statistics on HARQ retransmissions.

Feedback information 1002 from a radio access node includes the converted CQI related to the current radio channel conditions between the UE 314 and the access node, the RLC feedback between the UE 314 and the radio access node and information about required HARQ retransmissions. Information about the current load on the radio access node may also be useful in the context of the step 204.

Yet another source of information includes subscription data, which may be downloaded by the cluster head 100 from the core network. The subscription data may include information about services subscribed to by the UE 314. Based on the subscription data, e.g., the subscribed services, the cluster head 100 may derive (e.g., in the step 204) different requirements in terms of throughput or reliability, or even user specific policies and explicit rules of which operational mode to use or prefer.

Operator preferences, e.g. in the form of policies, may also impact the step 204. The preferences may be configured in the cluster head 100 or may be downloaded by the cluster head 100 from the core network (e.g., when needed in the step 204).

The information 1002, in particular and without limitation the information acquired from the UE 314 and/or one or more radio access nodes 303 to 307, may be retrieved upon demand. E.g., the information 1002 may be requested from the cluster head 100 on a case-by-case basis. Alternatively or in addition, the information 1002 may be acquired by the cluster head 100 by subscribing to information from the respective sources, e.g. the UE and/or one or more radio access nodes. For example, the respective source sends a notification to the cluster head 100, e.g. periodically or triggered by stipulated events, such as crossing of channel quality thresholds or retransmission thresholds, etc.

As has become apparent from above description of exemplary embodiments, the data flow within a cluster of radio access nodes can be more efficient under the control of a cluster head. In at least some embodiment, the radio access nodes can be coordinated to meet prescribed requirements under varying radio conditions.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of controlling a cluster of radio access nodes for radio communication with a user equipment, the method comprising:
   receiving information indicative of a radio quality of the radio communication supported by at least first and second subsets of the radio access nodes; and
   changing, based on the received information, a number of the radio access nodes in the first subset and/or the second subset, each of the radio access nodes in the first subset being configured to exchange, with the user equipment, corresponding or identical data packets relative to each of the other radio access nodes in the first subset, and each of the radio access nodes in the second subset being configured to exchange, with the user equipment, different data packets relative to each of the other radio access nodes in the second subset;
   wherein the changing includes switching, based on the received information, between a robustness-oriented mode of operating the cluster and a throughput-oriented mode of operating the cluster,
   wherein in the robustness-oriented mode a same copy of a data packet is transmitted to all of the at least two radio access nodes within the cluster,
   wherein in the throughput-oriented mode different data packets are transmitted to the radio access nodes within the cluster, and
   wherein the radio communication of at least some of the radio access nodes uses a millimeter wavelength band, an Extremely High Frequency band, or a frequency in the range of 15 GHz to 100 GHz.

2. The method of claim 1:
   wherein the number of radio access nodes in the first subset outnumber the number of radio access nodes in the second subset in the robustness-oriented mode;
   wherein the number of radio access nodes in the second subset outnumber the number of radio access nodes in the first subset in the throughput-oriented mode.

3. The method of claim 1, wherein the number of radio access nodes in the first subset is increased responsive to a decrease of the radio quality.

4. The method of claim 1, wherein the number of the radio access nodes in the first subset is decreased responsive to an increase of the radio quality.

5. The method of claim 1, wherein the received information differentiates the radio quality for different radio access nodes.

6. The method of claim 1, wherein at least some of the radio access nodes of the cluster concurrently serve the user equipment.

7. The method of claim 1, wherein the corresponding data packets are communicated concurrently.

8. The method of claim 1, further comprising providing, to the respective radio access nodes, the data packets to be transmitted to the user equipment.

9. The method of claim 8, wherein the data packets are provided to the radio access nodes according to a Packet Data Convergence Protocol.

10. The method of claim 1, wherein at least some of the radio access nodes communicate with the user equipment on the same radio frequency.

11. The method of claim 1, wherein the radio communication of at least some of the radio access nodes uses beamforming.

12. The method of claim 1, wherein the radio communication of at least some of the radio access nodes uses an antenna array.

13. The method of claim 1, wherein at least some of the radio access nodes define different cells of a cellular radio access network.

14. The method of claim 1:
wherein at least two of the radio access nodes define neighboring cells; and
wherein the at least two radio access nodes are comprised in the first subset if the radio quality indicates a mobility transition of the user equipment between the neighboring cells.

15. The method of claim 1, wherein the information received from the user equipment is based on at least one of: a Reference Signal Received Power, a Reference Signal Received Quality, and a path loss measured by the user equipment.

16. The method of claim 1, wherein the information received from the user equipment is further indicative of at least one of: a communication capability of the user equipment, a Quality of Service requirement, a data throughput requirement, and sensitivity to packet loss.

17. The method of claim 1, wherein the information received from one or more of the radio access nodes is based on at least one of:
a Channel Quality Indicator received from the user equipment by the respective radio access node; and
a packet loss according to a Radio Link Control of the respective radio access node.

18. The method of claim 1, wherein the method is performed by one of the radio access nodes.

19. The method of claim 1, wherein control plane signaling comprising receiving the information is performed between the user equipment and one or a plurality of the radio access nodes in the first subset.

20. A non-transitory computer readable recording medium storing a computer program product for controlling a cluster of radio access nodes for radio communication with a user equipment, the computer program product comprising software instructions which, when run on processing circuitry of a computing device, causes the computing device to:
receive information indicative of a radio quality of the radio communication supported by at least first and second subsets of the radio access nodes; and
change, based on the received information, a number of the radio access nodes in the first subset and/or the second subset, each of the radio access nodes in the first subset being configured to exchange, with the user equipment, corresponding or identical data packets relative to each of the other radio access nodes in the first subset, and each of the radio access nodes in the second subset being configured to exchange, with the user equipment, different data packets relative to each of the other radio access nodes in the second subset,
wherein the change includes switching, based on the received information, between a robustness-oriented mode of operating the cluster and a throughput-oriented mode of operating the cluster,
wherein in the robustness-oriented mode a same copy of a data packet is transmitted to all of the at least two radio access nodes within the cluster,
wherein in the throughput-oriented mode different data packets are transmitted to the radio access nodes within the cluster, and
wherein the radio communication of at least some of the radio access nodes uses a millimeter wavelength band, an Extremely High Frequency band, or a frequency in the range of 15 GHz to 100 GHz.

21. A device for controlling a cluster of radio access nodes for radio communication with a user equipment, the device comprising:
processing circuitry;
memory containing instructions executable by the processing circuitry whereby the device is operative to:
receive information indicative of a radio quality of the radio communication; and
change, based on the received information, a number of the radio access nodes in the first subset and/or the second subset, each of the radio access nodes in the first subset being configured to exchange, with the user equipment, corresponding or identical data packets relative to each of the other radio access nodes in the first subset, and each of the radio access nodes in the second subset being configured to exchange, with the user equipment, different data packets relative to each of the other radio access nodes in the second subset,
wherein the change includes switching, based on the received information, between a robustness-oriented mode of operating the cluster and a throughput-oriented mode of operating the cluster,
wherein in the robustness-oriented mode a same copy of a data packet is transmitted to all of the at least two radio access nodes within the cluster,
wherein in the throughput-oriented mode different data packets are transmitted to the radio access nodes within the cluster, and
wherein the radio communication of at least some of the radio access nodes uses a millimeter wavelength band, an Extremely High Frequency band, or a frequency in the range of 15 GHz to 100 GHz.

22. The method of claim 21:
wherein the number of radio access nodes in the first subset outnumber the number of radio access nodes in the second subset in the robustness-oriented mode;
wherein the number of radio access nodes in the second subset outnumber the number of radio access nodes in the first subset in the throughput-oriented mode.

* * * * *